United States Patent [19]

Lowery et al.

[11] Patent Number: 5,894,554
[45] Date of Patent: Apr. 13, 1999

[54] SYSTEM FOR MANAGING DYNAMIC WEB PAGE GENERATION REQUESTS BY INTERCEPTING REQUEST AT WEB SERVER AND ROUTING TO PAGE SERVER THEREBY RELEASING WEB SERVER TO PROCESS OTHER REQUESTS

[75] Inventors: Keith Lowery, Richardson; Andrew B. Levine, Plano; Ronald L. Howell, Rowlett, all of Tex.

[73] Assignee: InfoSpinner, Inc., Richardson, Tex.

[21] Appl. No.: 08/636,477

[22] Filed: Apr. 23, 1996

[51] Int. Cl.⁶ .................. G06F 13/14; G06F 13/20
[52] U.S. Cl. .................. 395/200.33; 395/200.68; 395/200.75; 395/680; 707/10; 707/104
[58] Field of Search .................. 358/400; 395/800, 395/700, 200.68, 200.75, 200.53, 680, 200.33; 707/104, 10

[56] References Cited

U.S. PATENT DOCUMENTS

| | | | |
|---|---|---|---|
| 4,866,706 | 9/1989 | Christophersen et al. | 370/85.7 |
| 5,341,499 | 8/1994 | Doragh | 395/700 |
| 5,392,400 | 2/1995 | Berkowitz et al. | 395/200 |
| 5,404,522 | 4/1995 | Carmon et al. | 395/650 |
| 5,404,523 | 4/1995 | DellaFera et al. | 395/650 |
| 5,404,527 | 4/1995 | Irwin et al. | 395/700 |
| 5,452,460 | 9/1995 | Distelberg et al. | 395/700 |
| 5,532,838 | 7/1996 | Barbari | 358/400 |
| 5,751,956 | 5/1998 | Kirsch | 395/200.33 |
| 5,761,673 | 6/1998 | Bookman et al. | 707/104 |

OTHER PUBLICATIONS

"Beyond the Web: Excavating the Real World Via Mosaic", Goldberg et al, Second International WWW, Oct. 17, 1994.
PCT International Search Report, Aug. 21, 1997.

*Primary Examiner*—Thomas C. Lee
*Assistant Examiner*—Rehana Perveen
*Attorney, Agent, or Firm*—Blakely, Sokoloff, Taylor & Zafman LLP

[57] ABSTRACT

The present invention teaches a method and apparatus for creating and managing custom Web sites. Specifically, one embodiment of the present invention claims a computer-implemented method for managing a dynamic Web page generation request to a Web server, the computer-implemented method comprising the steps of routing the request from the Web server to a page server, the page server receiving the request and releasing the Web server to process other requests, processing the request, the processing being performed by the page server concurrently with the Web server, as the Web server processes the other requests, and dynamically generating a Web page in response to the request, the Web page including data dynamically retrieved from one or more data sources.

11 Claims, 5 Drawing Sheets

SYSTEM FOR MANAGING DYNAMIC WEB PAGE GENERATION REQUESTS BY INTERCEPTING REQUEST AT WEB SERVER AND ROUTING TO PAGE SERVER THEREBY RELEASING WEB SERVER TO PROCESS OTHER REQUESTS

FIELD OF THE INVENTION

The present invention relates to the field of Internet technology. Specifically, the present invention relates to the creation and management of custom World Wide Web sites.

DESCRIPTION OF RELATED ART

The World Wide Web (the Web) represents all of the computers on the Internet that offer users access to information on the Internet via interactive documents or Web pages. These Web pages contain hypertext links that are used to connect any combination of graphics, audio, video and text, in a non-linear, non-sequential manner. Hypertext links are created using a special software language known as HyperText Mark-Up Language (HTML).

Once created, Web pages reside on the Web, on Web servers or Web sites. A Web site can contain numerous Web pages. Web client machines running Web browsers can access these Web pages at Web sites via a communications protocol known as HyperText Transport Protocol (HTTP). Web browsers are software interfaces that run on World Wide Web clients to allow access to Web sites via a simple user interface. A Web browser allows a Web client to request a particular Web page from a Web site by specifying a Uniform Resource Locator (URL). A URL is a Web address that identifies the Web page and its location on the Web. When the appropriate Web site receives the URL, the Web page corresponding to the requested URL is located, and if required, HTML output is generated. The HTML output is then sent via HTTP to the client for formatting on the client's screen.

Although Web pages and Web sites are extremely simple to create, the proliferation of Web sites on the Internet highlighted a number of problems. The scope and ability of a Web page designer to change the content of the Web page was limited by the static nature of Web pages. Once created, a Web page remained static until it was manually modified. This in turn limited the ability of Web site managers to effectively manage their Web sites.

The Common Gateway Interface (CGI) standard was developed to resolve the problem of allowing dynamic content to be included in Web pages. CGI "calls" or procedures enable applications to generate dynamically created HTML output, thus creating Web pages with dynamic content. Once created, these CGI applications do not have to be modified in order to retrieve "new" or dynamic data. Instead, when the Web page is invoked, CGI "calls" or procedures are used to dynamically retrieve the necessary data and to generate a Web page.

CGI applications also enhanced the ability of Web site administrators to manage Web sites. Administrators no longer have to constantly update static Web pages. A number of vendors have developed tools for CGI based development, to address the issue of dynamic Web page generation. Companies like Spider™ and Bluestone™, for example, have each created development tools for CGI-based Web page development. Another company, Haht Software™, has developed a Web page generation tool that uses a BASIC-like scripting language, instead of a CGI scripting language.

Tools that generate CGI applications do not, however, resolve the problem of managing numerous Web pages and requests at a Web site. For example, a single company may maintain hundreds of Web pages at their Web site. Current Web server architecture also does not allow the Web server to efficiently manage the Web page and process Web client requests. Managing these hundreds of Web pages in a coherent manner and processing all requests for access to the Web pages is thus a difficult task. Existing development tools are limited in their capabilities to facilitate dynamic Web page generation, and do not address the issue of managing Web requests or Web sites.

SUMMARY OF THE INVENTION

It is therefore an object of the present invention to provide a method and apparatus for creating and managing custom Web sites. Specifically, the present invention claims a method and apparatus for managing dynamic web page generation requests.

In one embodiment, the present invention claims a computer-implemented method for managing a dynamic Web page generation request to a Web server, the computer-implemented method comprising the steps of routing the request from the Web server to a page server, the page server receiving the request and releasing the Web server to process other requests, processing the request, the processing being performed by the page server concurrently with the Web server, as the Web server processes the other requests, and dynamically generating a Web page in response to the request, the Web page including data dynamically retrieved from one or more data sources. Other embodiments also include connection caches to the one or more data sources, page caches for each page server, and custom HTML extension templates for configuring the Web page.

Other objects, features and advantages of the present invention will be apparent from the accompanying drawings and from the detailed description.

DETAILED DESCRIPTION OF THE PREFERRED EMBODIMENT

The present invention relates to a method and apparatus for creating and managing custom Web sites. In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown in detail in order not to unnecessarily obscure the present invention.

Figure 1:
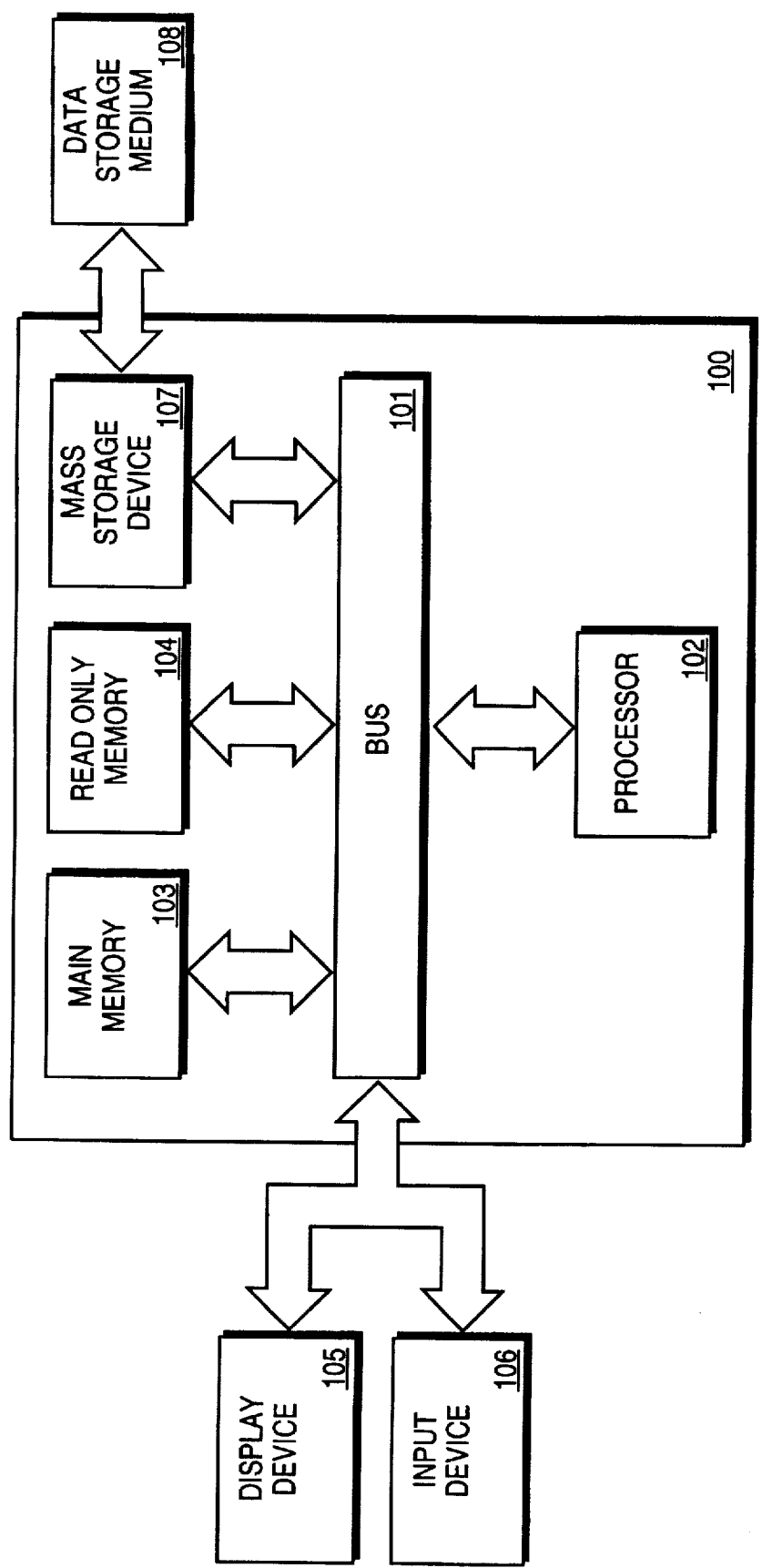
FIG. 1 illustrates a typical computer system in which the present invention operates.

FIG. 1 illustrates a typical computer system 100 in which the present invention operates. The preferred embodiment of the present invention is implemented on an IBM™ Personal Computer manufactured by IBM Corporation of Armonk. N.Y. An alternate embodiment may be implemented on an RS/6000™ Workstation manufactured by IBM Corporation of Armonk, N.Y. It will be apparent to those of ordinary skill in the art that other computer system architectures may also be employed.

In general, such computer systems as illustrated by FIG. 1 comprise a bus 101 for communicating information, a processor 102 coupled with the bus 101 for processing information, main memory 103 coupled with the bus 101 for storing information and instructions for the processor 102, a read-only memory 104 coupled with the bus 101 for storing static information and instructions for the processor 102, a display device 105 coupled with the bus 101 for displaying information for a computer user, an input device 106 coupled with the bus 101 for communicating information and command selections to the processor 102, and a mass storage device 107, such as a magnetic disk and associated disk drive, coupled with the bus 101 for storing information and instructions. A data storage medium 108 containing digital information is configured to operate with mass storage device 107 to allow processor 102 access to the digital information on data storage medium 108 via bus 101.

Processor 102 may be any of a wide variety of general purpose processors or microprocessors such as the Pentium™ microprocessor manufactured by Intel™ Corporation or the RS/6000™ processor manufactured by IBM Corporation. It will be apparent to those of ordinary skill in the art, however, that other varieties of processors may also be used in a particular computer system. Display device 105 may be a liquid crystal device, cathode ray tube (CRT), or other suitable display device. Mass storage device 107 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 108 may be a hard disk, a floppy disk, a CD-ROM, a magnetic tape, or other magnetic or optical data storage medium.

In general, processor 102 retrieves processing instructions and data from a data storage medium 108 using mass storage device 107 and downloads this information into random access memory 103 for execution. Processor 102, then executes an instruction stream from random access memory 103 or read-only memory 104. Command selections and information input at input device 106 are used to direct the flow of instructions executed by processor 102. Equivalent input device 106 may also be a pointing device such as a conventional mouse or trackball device. The results of this processing execution are then displayed on display device 105.

The preferred embodiment of the present invention is implemented as a software module, which may be executed on a computer system such as computer system 100 in a conventional manner. Using well known techniques, the application software of the preferred embodiment is stored on data storage medium 108 and subsequently loaded into and executed within computer system 100. Once initiated, the software of the preferred embodiment operates in the manner described below.

Figure 2:
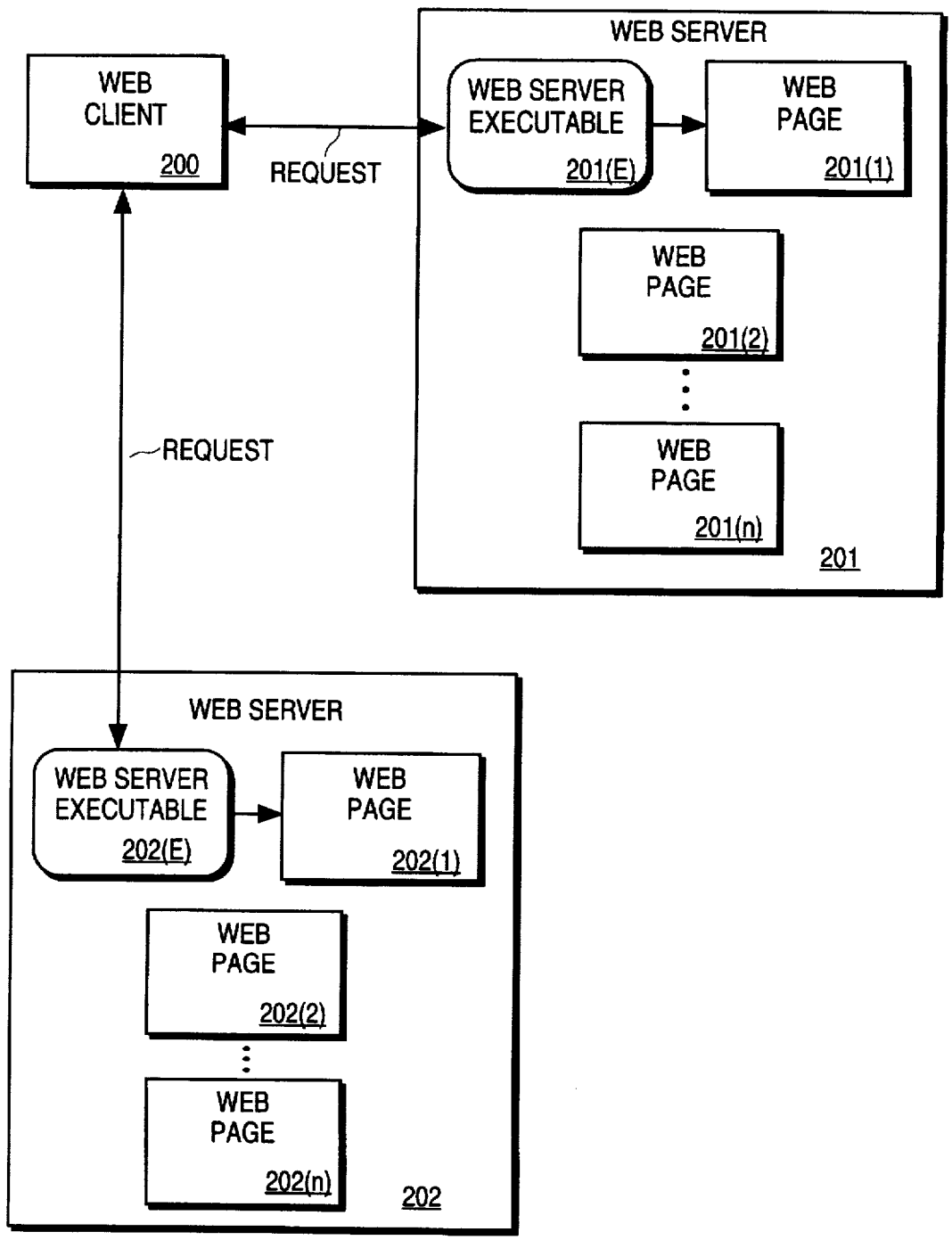
FIG. 2 illustrates a typical prior art Web server environment.

FIG. 2 illustrates a typical prior art Web server environment. Web client 200 can make URL requests to Web server 201 or Web server 202. Web servers 201 and 202 include Web server executables, 201(E) and 202(E) respectively, that perform the processing of Web client requests. Each Web server may have a number of Web pages 201(1)–(n) and 202(1)–(n). Depending on the URL specified by the Web client 200, the request may be routed by either Web server executable 201(E) to Web page 201 (1), for example, or from Web server executable 202(E) to Web page 202 (1). Web client 200 can continue making URL requests to retrieve other Web pages. Web client 200 can also use hyperlinks within each Web page to "jump" to other Web pages or to other locations within the same Web page.

Figure 3:
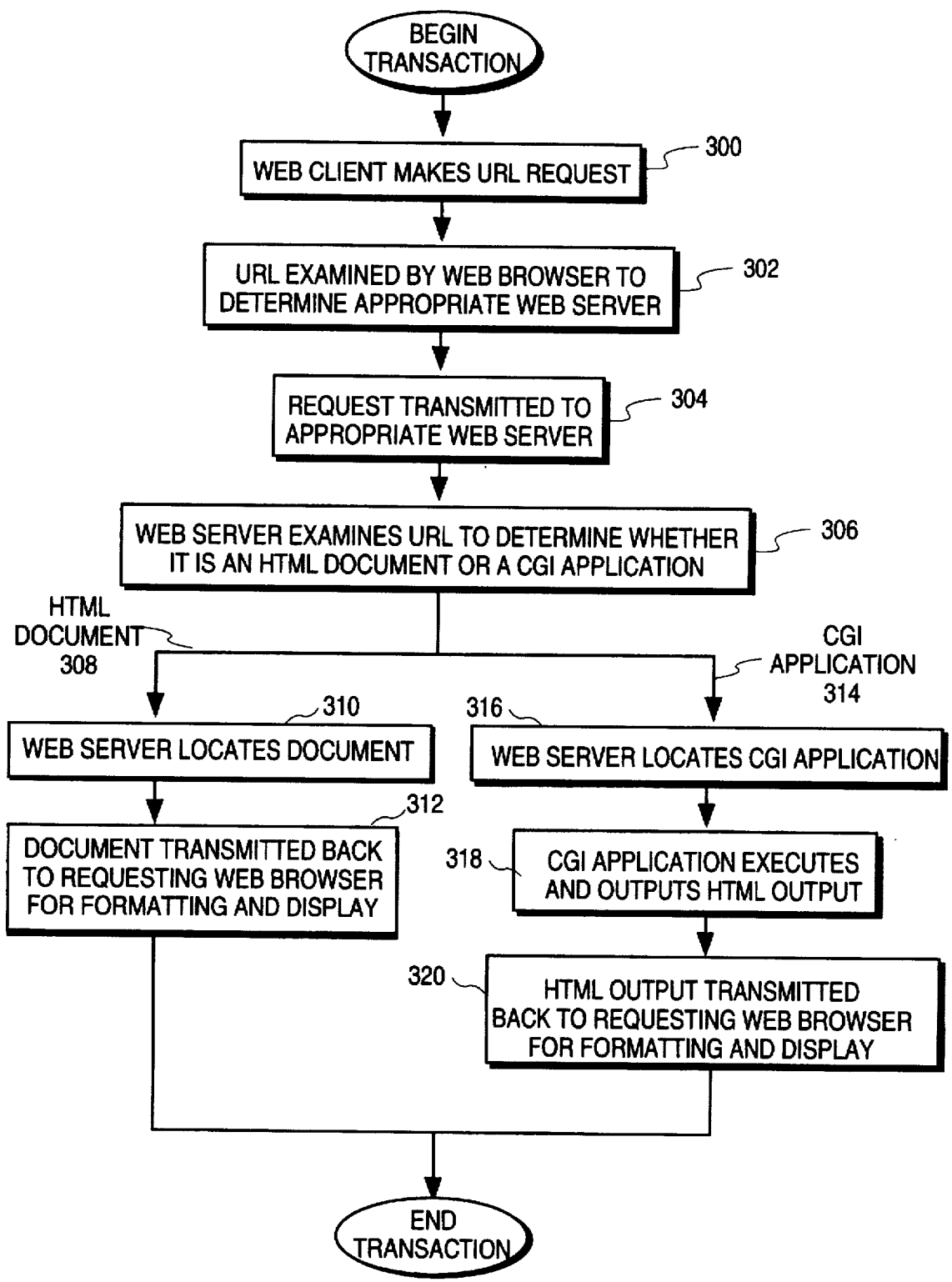
FIG. 3 illustrates a typical prior art Web server environment in the form of a flow diagram.

FIG. 3 illustrates this prior art Web server environment in the form of a flow diagram. In processing block 300, the Web client makes a URL request. This URL request is examined by the Web browser to determine the appropriate Web server to route the request to in processing block 302. In processing block 304 the request is then transmitted from the Web browser to the appropriate Web server, and in processing block 306 the Web server executable examines the URL to determine whether it is a HTML document or a CGI application. If the request is for an HTML document 308, then the Web server executable locates the document in processing block 310. The document is then transmitted back through the requesting Web browser for formatting and display in processing block 312.

If the URL request is for a CGI application 314, however, the Web server executable locates the CGI application in processing block 316. The CGI application then executes and outputs HTML output in processing block 318 and finally, the HTML output is transmitted back to requesting Web browser for formatting and display in processing block 320.

This prior art Web server environment does not, however, provide any mechanism for managing the Web requests or the Web sites. As Web sites grow, and as the number of Web clients and requests increase, Web site management becomes a crucial need.

For example, a large Web site may receive thousands of requests or "hits" in a single day. Current Web servers process each of these requests on a single machine, namely the Web server machine. Although these machines may be running "multi-threaded" operating systems that allow transactions to be processed by independent "threads," all the threads are nevertheless on a single machine, sharing a processor. As such, the Web executable thread may hand off a request to a processing thread, but both threads will still have to be handled by the processor on the Web server machine. When numerous requests are being simultaneously processed by multiple threads on a single machine, the Web server can slow down significantly and become highly inefficient. The claimed invention addresses this need by utilizing a partitioned architecture to facilitate the creation and management of custom Web sites and servers.

Figure 4:
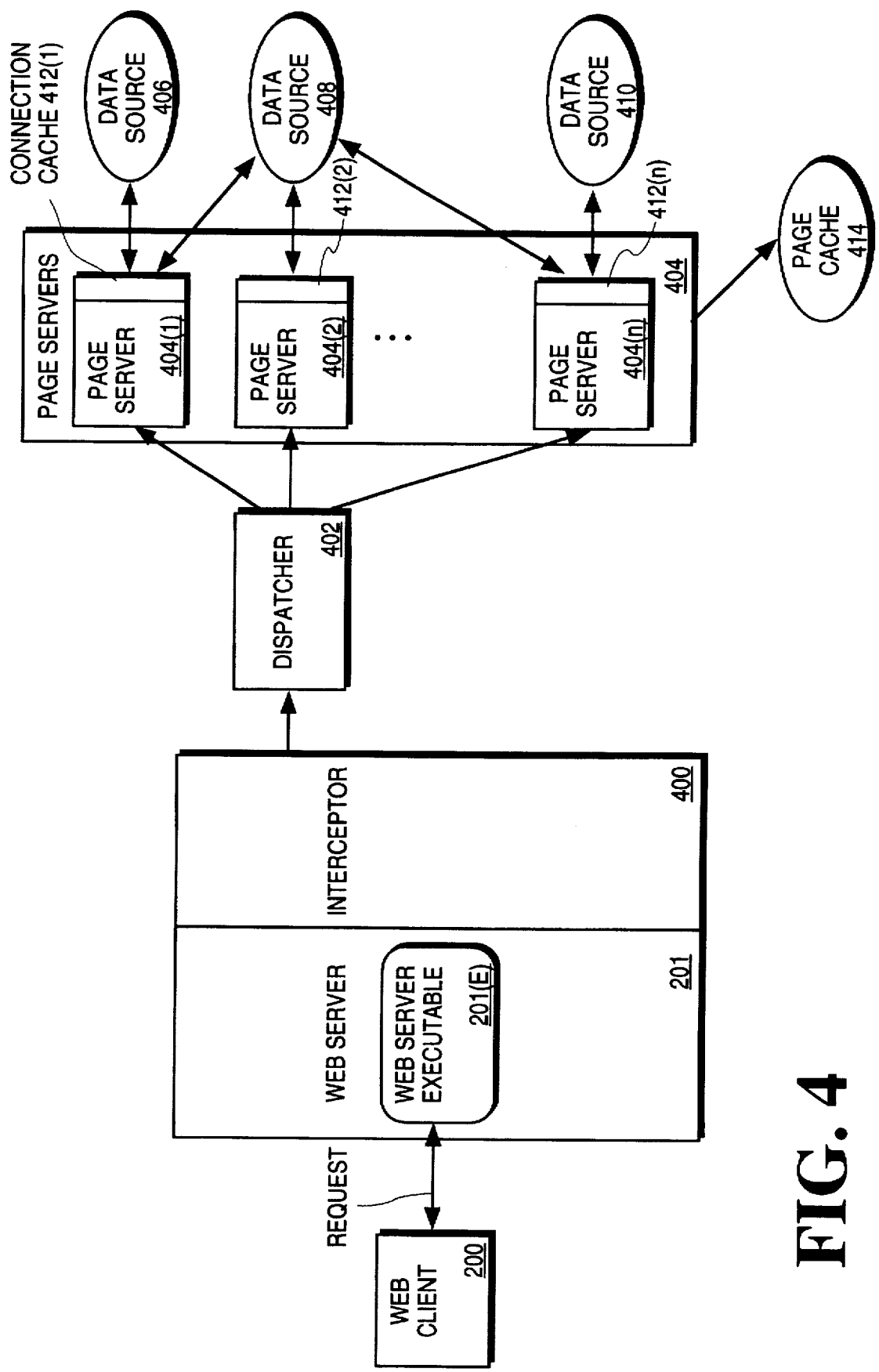
FIG. 4 illustrates one embodiment of the presently claimed invention.

FIG. 4 illustrates one embodiment of the presently claimed invention. Web client 200 issues a URL request that is processed to determined proper routing. In this embodiment, the request is routed to Web server 201. Instead of Web server executable 201(E) processing the URL request, however, Interceptor 400 intercepts the request and routes it to Dispatcher 402. In one embodiment, Interceptor 400 resides on the Web server machine as an extension to Web server 201. This embodiment is appropriate for Web servers such as Netsite™ from Netscape, that support such extensions. A number of public domain Web servers, such as NCSA™ from the National Center for Supercomputing Applications at the University of Illinois, Urbana-Champaign, however, do not provide support for this type of extension. Thus, in an alternate embodiment, Interceptor 400 is an independent module, connected via an "intermediate program" to Web server 201. This intermediate program can be a simple CGI application program that connects Interceptor 400 to Web server 201. Alternate intermediate programs the perform the same functionality can also be implemented.

In one embodiment of the invention, Dispatcher 402 resides on a different machine than Web server 201. This embodiment overcomes the limitation described above, in prior art Web servers, wherein all processing is performed by the processor on a single machine. By routing the request to Dispatcher 402 residing on a different machine than the Web server executable 201(E), the request can then be processed by a different processor than the Web server executable 201(E). Web server executable 201(E) is thus free to continue servicing client requests on Web server 201 while the request is processed "off-line," at the machine on which Dispatcher 402 resides.

Dispatcher 402 can, however, also reside on the same machine as the Web server. The Web site administrator has the option of configuring Dispatcher 402 on the same machine as Web server 201, taking into account a variety of factors pertinent to a particular Web site, such as the size of the Web site, the number of Web pages and the number of hits at the Web site. Although this embodiment will not enjoy the advantage described above, namely off-loading the processing of Web requests from the Web server machine, the embodiment does allow flexibility for a small Web site to grow. For example, a small Web site administrator can use a single machine for both Dispatcher 402 and Web server 201 initially, then off-load Dispatcher 402 onto a separate machine as the Web site grows. The Web site can thus take advantage of other features of the present invention regardless of whether the site has separate machines configured as Web servers and dispatchers.

Dispatcher 402 receives the intercepted request and then dispatches the request to one of a number of Page servers 404 (1)–(n). For example, if Page server 404 (1) receives the dispatched request, it processes the request and retrieves the data from an appropriate data source, such as data source 406, data source 408, or data source 410. Data sources, as used in the present application, include databases, spreadsheets, files and any other type of data repository. Page server 404 (1) can retrieve data from more than one data source and incorporate the data from these multiple data sources in a single Web page.

In one embodiment, each Page server 404(1)–(n) resides on a separate machine on the network to distribute the processing of the request. Dispatcher 402 maintains a variety of information regarding each Page server on the network, and dispatches requests based on this information. For example, Dispatcher 402 retains dynamic information regarding the data sources that any given Page server can access. Dispatcher 402 thus examines a particular request and determines which Page servers can service the URL request. Dispatcher 402 then hands off the request to the appropriate Page server.

For example, if the URL request requires financial data from data source 408, dispatcher 402 will first examine an information list. Dispatcher 402 may determine that Page server 404(3), for example, has access to the requisite data in data source 408. Dispatcher 402 will thus route the URL request to Page server 404(3). This "connection caching" functionality is described in more detail below, under the heading "Performance."

Alternately, Dispatcher 402 also has the ability to determine whether a particular Page server already has the necessary data cached in the Page server's page cache (described in more detail below, under the heading "Performance"). Dispatcher 402 may thus determine that Page server 404(1) and 404(2) are both logged into Data source 408, but that Page server 404(2) has the financial information already cached in Page server 404(2)'s page cache. In this case, Dispatcher 402 will route the URL request to Page server 404(2) to more efficiently process the request.

Finally, Dispatcher 402 may determine that a number or all Page servers 404(1)–(n) are logged into Data source 408. In this scenario, Dispatcher 402 can examine the number of requests that each Page server is servicing and route the request to the least busy page server. This "load balancing" capability can significantly increase performance at a busy Web site and is discussed in more detail below, under the heading "Scalability".

If, for example, Page server 404(2), receives the request, Page server 404(2) will process the request. While Page server 404(2) is processing the request, Web server executable 201(E) can concurrently process other Web client requests. This partitioned architecture thus allows both Page server 404(2) and Web server executable 201(E) to simultaneously process different requests, thus increasing the efficiency of the Web site. Page server 404(2) dynamically generates a Web page in response to the Web client request, and the dynamic Web page is then either transmitted back to requesting Web client 200 or stored on a machine that is accessible to Web server 201, for later retrieval.

One embodiment of the claimed invention also provides a Web page designer with HTML extensions, or "dyna" tags. These dyna tags provide customized HTML functionality to a Web page designer, to allow the designer to build customized HTML templates that specify the source and placement of retrieved data. For example, in one embodiment, a "dynatext" HTML extension tag specifies a data source and a column name to allow the HTML template to identify the data source to log into and the column name from which to retrieve data. Alternatively, "dyna-anchor" tags allow the designer to build hyperlink queries while "dynablock" tags provide the designer with the ability to iterate through blocks of data. Page servers use these HTML templates to create dynamic Web pages. Then, as described above, these dynamic Web pages are either transmitted back to requesting Web client 200 or stored on a machine that is accessible to Web server 201, for later retrieval.

The presently claimed invention provides numerous advantages over prior art Web servers, including advantages in the areas of performance, security, extensibility and scalability.

Performance

One embodiment of the claimed invention utilizes connection caching and page caching to improve performance. Each Page server can be configured to maintain a cache of connections to numerous data sources. For example, as illustrated in FIG. 4, Page server 404(1) can retrieve data from data source 406, data source 408 or data source 410. Page server 404(1) can maintain connection cache 412(1), containing connections to each of data source 406, data source 408 and data source 410, thus eliminating connect times from the Page servers to those data sources.

Additionally, another embodiment of the present invention supports the caching of finished Web pages, to optimize the performance of the data source being utilized. This "page caching" feature, illustrated in FIG. 4 as Page cache 414, allows the Web site administrator to optimize the performance of data sources by caching Web pages that are repeatedly accessed. Once the Web page is cached, subsequent requests or "hits" will utilize the cached Web page rather than re-accessing the data source. This can radically improve the performance of the data source.

Security

The present invention allows the Web site administrator to utilize multiple levels of security to manage the Web site. In one embodiment, the Page server can utilize all standard encryption and site security features provided by the Web server. In another embodiment, the Page server can be configured to bypass connection caches 412(1)–(n), described above, for a particular data source and to require entry of a user-supplied identification and password for the particular data source the user is trying to access.

Additionally, another embodiment of the presently claimed invention requires no real-time access of data sources. The Web page caching ability, described above, enables additional security for those sites that want to publish non-interactive content from internal information systems, but do not want real-time Internet accessibility to those internal information systems. In this instance, the Page server can act as a "replication and staging gent" and create Web pages in batches, rather than in real-time. These "replicated" Web pages are then "staged" for access at a later time, and access o the Web pages in this scenario is possible even if the Page server and dispatcher are not present later.

In yet another embodiment, the Page server can make a single pass through a Web library, and compile a Web site that exists in the traditional form of separately available files. A Web library is a collection of related Web books and Web pages. More specifically, the Web library is a hierarchical organization of Web document templates, together with all the associated data source information. Information about an entire Web site is thus contained in a single physical file, thus simplifying the problem of deploying Web sites across multiple Page servers. The process of deploying the Web site in this embodiment is essentially a simple copy of a single file.

Extensibility

One embodiment of the present invention provides the Web site administrator with Object Linking and Embedding (OLE) 2.0 extensions to extend the page creation process. These OLE 2.0 extensions also allow information submitted over the Web to be processed with user-supplied functionality. Utilizing development tools such as Visual Basic, Visual C++ or PowerBuilder that support the creation of OLE 2.0 automation, the Web site administrator can add features and modify the behavior of the Page servers described above. This extensibility allows one embodiment of the claimed invention to be incorporated with existing technology to develop an infinite number of custom web servers.

For example, OLE 2.0 extensions allow a Web site administrator to encapsulate existing business rules in an OLE 2.0 automation interface, to be accessed over the Web. One example of a business rule is the steps involved in the payoff on an installment or mortgage loan. The payoff may involve, for example, taking into account the current balance, the date and the interest accrued since the last payment. Most organizations already have this type of business rule implemented using various applications, such as Visual Basic for client-server environments, or CICS programs on mainframes. If these applications are OLE 2.0 compliant, the Page server "dynaobject" HTML extension tag can be used to encapsulated the application in an OLE 2.0 automation interface. The Page server is thus extensible, and can incorporate the existing application with the new Page server functionality.

Scalability

One embodiment of the claimed invention allows "plug and play" scalability. As described above, referring to FIG. 4, Dispatcher 402 maintains information about all the Page servers configured to be serviced by Dispatcher 402. Any number of Page servers can thus be "plugged" into the configuration illustrated in FIG. 4, and the Page servers will be instantly activated as the information is dynamically updated in Dispatcher 402. The Web site administrator can thus manage the overhead of each Page server and modify each Page server's load, as necessary, to improve performance. In this manner, each Page server will cooperate with other Page servers within a multi-server environment. Dispatcher 402 can examine the load on each Page server and route new requests according to each Page server's available resources. This "load-balancing" across multiple Page servers can significantly increase a Web site's performance.

Figure 5:
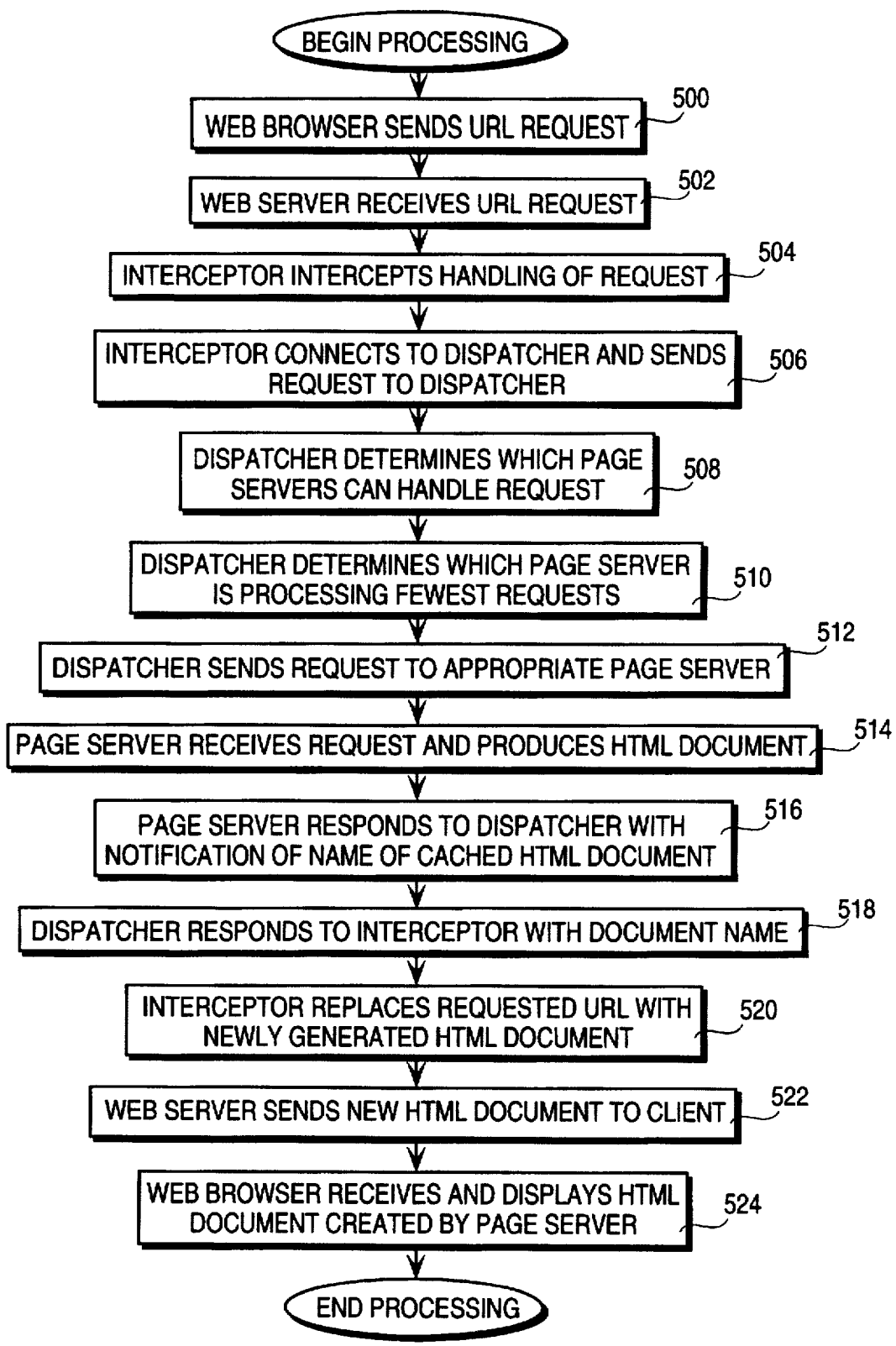
FIG. 5 illustrates the processing of a Web browser request in the farm of a flow diagram, according to one embodiment of the presently claimed invention.

FIG. 5 illustrates the processing of a Web browser request in the form of a flow diagram, according to one embodiment of the presently claimed invention. A Web browser sends a URL request to a Web server in processing block 500. In processing block 502, the Web server receives the URL request, and an interceptor then intercepts the handling of the request in processing block 504. The interceptor connects to a dispatcher and sends the URL request to the dispatcher in processing block 506. In processing block 508, the dispatcher determines which Page servers can handle the request. The dispatcher also determines which Page server is processing the fewest requests in processing block 510, and in processing block 512, the dispatcher sends the URL request to an appropriate Page server. The Page server receives the request and produces an HTML document in processing block 514. The Page server then responds to the dispatcher with notification of the name of the cached HTML document in processing block 516. In processing block 518, the dispatcher responds to the interceptor with the document name, and the interceptor then replaces the requested URL with the newly generated HTML document in processing block 520. The Web server then sends the new HTML document to the requesting client in processing block 522. Finally, the Web browser receives and displays the HTML document created by the Page server at processing block 524.

Thus, a method and apparatus for creating and managing custom Web sites is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. A computer-implemented method for managing a dynamic Web page generation request to a Web server, said computer-implemented method comprising the steps of:

routing said request from said Web server to a page server, said page server receiving said request and releasing said Web server to process other requests, wherein said routing step further includes the steps of intercepting said request at said Web server, routing said request from said Web server to a dispatcher, and dispatching said request to said page server;

processing said request, said processing being performed by said page server while said Web server concurrently processes said other requests; and dynamically generating a Web page in response to said request, said Web page including data dynamically retrieved from one or more data sources.

2. The computer-implemented method in claim 1 wherein said step of processing said request includes the step of identifying said one or more data sources from which to retrieve said data.

3. The computer-implemented method in claim 2 wherein said step of dynamically generating said Web page includes the step of dynamically retrieving said data from said one or more data sources.

4. The computer-implemented method in claim 3 wherein said step of processing said request includes the step of said page server maintaining a connection cache to said one or more data sources.

5. The computer-implemented method in claim 3 wherein said step of processing said request includes the step of logging into said one or more data sources.

6. The computer-implemented method in claim 3 wherein said step of dynamically generating said Web page includes the step of maintaining a page cache containing said Web page.

7. The computer-implemented method in claim 3 wherein said page server includes custom HTML extension templates for configuring said Web page.

8. The computer-implemented method in claim 7 wherein said step of processing said request further includes the step of inserting said dynamically retrieved data from said one or more data sources into said custom HTML extension templates.

9. A networked system for managing a dynamic Web page generation request, said system comprising:

one or more data sources;

a page server having a processing means;

a first computer system including means for generating said request; and a second computer system including means for receiving said request from said first computer, said second computer system also including a router, said router routing said request from said second computer system to said page server, wherein said routing further includes intercepting said request at said second computer, routing said request from said second computer to a dispatcher, and dispatching said request to said page server said page server receiving said request and releasing said second computer system to process other requests, said page server processing means processing said request and dynamically generating a Web page in response to said request, said Web page including data dynamically retrieved from said one or more data sources.

10. The networked system in claim 9 wherein said router in said second computer system includes:

an interceptor intercepting said request at said second computer system and routing said request; and a dispatcher receiving said routed request from said interceptor and dispatching said request to said page server.

11. A machine readable medium having stored thereon data representing sequences of instructions, which when executed by a computer system, cause said computer system to perform the steps of:

routing a dynamic Web page generation request from a Web server to a page server, said page server receiving said request and releasing said Web server to process other requests wherein said routing step further includes the steps of intercepting said request at said Web server, routing said request from said Web server to a dispatcher, and dispatching said request to said page server;

processing said request, said processing being performed by said page server while said Web server concurrently processes said other requests; and dynamically generating a Web page, said Web page including data retrieved from one or more data sources.

* * * * *

UNITED STATES PATENT AND TRADEMARK OFFICE
CERTIFICATE OF CORRECTION

PATENT NO. : 5,894,554 C1
APPLICATION NO. : 90/008342
DATED : July 24, 2012
INVENTOR(S) : Keith Lowery et al.

It is certified that error appears in the above-identified patent and that said Letters Patent is hereby corrected as shown below:

Column 1, line 20-Column 4, line 45, delete claims 12-49 and replace with the following claims 12-49:

*12. A computer-implemented method for managing a dynamic Web page generation request to a Web server, said computer-implemented method comprising the steps of:*
- *routing said request from said Web server to a selected page server, said selected page server receiving said request and releasing said Web server to process other requests, wherein said routing step further includes the steps of intercepting said request at said Web server, routing said request from said Web server to a dispatcher, and dispatching, by said dispatcher, said request to said selected page server;*
- *processing said request, said processing being performed by said selected page server while said Web server concurrently processes said other requests; and*
- *dynamically generating a Web page by said selected page server in response to said request, said Web page including data dynamically retrieved from one or more data sources; and*
- *wherein dispatching includes:*
  - *examining said request to make a selection of which page server should process said request from among a plurality of page servers that can each generate said Web page requested by said request;*
  - *selecting one of said plurality of page servers to dynamically generate said Web page;*
  - *wherein said selection is based on examining dynamic information regarding a load associated with each of said plurality of page servers; and*
  - *sending said request to said selected page server based on said examination.*

Signed and Sealed this
Second Day of October, 2012

David J. Kappos
*Director of the United States Patent and Trademark Office*

13. The computer-implemented method in claim 12 wherein said step of processing said request includes the step of identifying said one or more data sources from which to retrieve said data.

14. The computer-implemented method in claim 13 wherein said step of dynamically generating said Web page includes the step of dynamically retrieving said data from said one or more data sources.

15. The computer-implemented method in claim 14 wherein said step of processing said request includes the step of said selected page server maintaining a connection cache to said one or more data sources.

16. The computer-implemented method in claim 14 wherein said step of processing said request includes the step of logging into said one or more data sources.

17. The computer-implemented method in claim 14 wherein said step of dynamically generating said Web page includes the step of maintaining a page cache containing said Web page.

18. The computer-implemented method in claim 14 wherein said selected page server includes custom HTML extension templates for configuring said Web page.

19. The computer-implemented method in claim 18 wherein said step of processing said request further includes the step of inserting said dynamically retrieved data from said one or more data sources into said custom HTML extension templates.

20. A machine readable medium having stored thereon data representing sequences of instructions, which when executed by a computer system, cause said computer system to perform the steps of:
routing a dynamic Web page generation request from a Web server to a selected page server, said selected page server receiving said request and releasing said Web server to process other requests wherein said routing step further includes the steps of intercepting said request at said Web server, routing said request from said Web server to a dispatcher, and dispatching, by said dispatcher, said request to said selected page server;
processing said request, said processing being performed by said selected page server while said Web server concurrently processes said other requests; and
dynamically generating a Web page by said selected page server, said Web page including data retrieved from one or more data sources; and
wherein dispatching includes:
examining said request to make a selection of which page server should process said request from among a plurality of page servers that can each generate the Web page requested by said request;
selecting one of said plurality of page servers to dynamically generate said Web page;
wherein said selection is based on examining dynamic information regarding a load associated with each of said plurality of page servers; and
sending said request to said selected page server based on said examination.

21. The computer-implemented method of Claim 12, wherein intercepting said request consists of determining that a page server should process the request.

22. The computer-implemented method of Claim 12, wherein intercepting said request includes determining that a page server should process the request.

23. The computer-implemented method of Claim 22, wherein said determining step includes determining that Web requests should be processed by a page server.

24. The computer-implemented method of Claim 23, wherein said determining step includes determining that other requests should be processed by said Web server.

25. The computer-implemented method of Claim 12, wherein releasing said Web server consists of freeing at least some resources of said Web server.

26. The computer-implemented method of Claim 12, wherein said selected page server comprises application software and operating system software.

27. The computer-implemented method of Claim 12, wherein routing said request is based at least in part on a uniform resource locator associated with the request.

28. The computer-implemented method of Claim 12, further comprising:
retaining dynamic information regarding data sources that any page server can access to generate the Web page relative to the request.

29. The computer-implemented method of Claim 12 wherein information used to select said selected page server includes whether a Web page relative to said request is cached at said selected page server.

30. The computer-implemented method of Claim 12, further comprising:
receiving dynamically updated information concerning said selected page server.

31. The computer-implemented method of Claim 12, further comprising:
sending said request according to said selected page server's available resources.

32. A computer-implemented method for managing a dynamic Web page generation request to a Web server, said computer-implemented method comprising the steps of:
routing said request from said Web server to a selected page server, said selected page server receiving said request and releasing said Web server to process other requests, wherein said routing step further includes the steps of intercepting said request at said Web server, routing said request from said Web server to a dispatcher, and dispatching, by said dispatcher, said request to said selected page server;
processing said request, said processing being performed by said selected page server while said Web server concurrently processes said other requests; and
dynamically generating a Web page by said selected page server in response to said request, said Web page including data dynamically retrieved from one or more data sources; and
wherein dispatching includes:
examining said request to make a selection of which page server should process said request from among a plurality of page servers that can each generate said Web page requested by said request;
selecting one of said plurality of page servers to dynamically generate said Web page;

wherein said selection is based on determining a least busy one from each of said plurality of page servers, said selected page server being determined as said least busy one of said plurality of page servers.

33. The computer-implemented method of Claim 12, further comprising:
receiving said generated Web page at said Web server;
providing said generated Web page from said Web server to a source of said request.

34. A computer-implemented method for managing a dynamic Web page generation request to a Web server, said computer-implemented method comprising the steps of:
routing said request from said Web server to a selected page server, said selected page server receiving said request and releasing said Web server to process other requests, wherein said routing step further includes the steps of intercepting said request at said Web server, routing said request from said Web server to a dispatcher, and dispatching, by said dispatcher, said request to said selected page server;
processing said request, said processing being performed by said selected page server while said Web server concurrently processes said other requests; and
dynamically generating a Web page by said selected page server in response to said request, said Web page including data dynamically retrieved from one or more data sources; and
wherein dispatching includes:
examining said request to make a selection of which page server should process said request from among a plurality of page servers that can each generate said Web page requested by said request;
selecting one of said plurality of page servers to dynamically generate said Web page;
wherein said selection is based on examining dynamic information regarding a relative busyness of each of said plurality of page servers and selecting said selected page server based on said examination.

35. The machine readable medium of Claim 20, wherein intercepting said request consists of determining that a page server should process the request.

36. The machine readable medium of Claim 20, wherein intercepting said request includes determining that a page server should process the request.

37. The machine readable medium of Claim 36, wherein said determining step includes determining that Web requests should be processed by a page server.

38. The machine readable medium of Claim 37, wherein said determining step includes determining that other requests should be processed by said Web server.

39. The machine readable medium of Claim 20, wherein releasing said Web server consists of freeing at least some resources of said Web server.

*40. The machine readable medium of Claim 20, wherein said selected page server comprises application software and operating system software.*

*41. The machine readable medium of Claim 20, wherein routing said request is based at least in part on a uniform resource locator associated with the request.*

*42. The machine readable medium of Claim 20, further comprising:*
*retaining dynamic information regarding data sources that any of the plurality of page servers can access to generate the Web page relative to the request.*

*43. The machine readable medium of Claim 20 wherein information used to select said selected page server includes whether a Web page relative to said request is cached at said selected page server.*

*44. The machine readable medium of Claim 20, further comprising:*
*receiving dynamically updated information concerning said selected page server.*

*45. The machine readable medium of Claim 20, further comprising:*
*sending said request according to said selected page server's available resources.*

*46. A machine readable medium having stored thereon data representing sequences of instructions, which when executed by a computer system, cause said computer system to perform the steps of:*
*routing a dynamic Web page generation request from a Web server to a selected page server, said selected page server receiving said request and releasing said Web server to process other requests wherein said routing step further includes the steps of intercepting said request at said Web server, routing said request from said Web server to a dispatcher, and dispatching, by said dispatcher, said request to said selected page server;*
*processing said request, said processing being performed by said selected page server while said Web server concurrently processes said other requests; and*
*dynamically generating a Web page by said selected page server, said Web page including data retrieved from one or more data sources; and*
*wherein dispatching includes:*
*examining said request to make a selection of which page server should process said request from among a plurality of page servers that can each generate the Web page requested by said request;*
*selecting one of said plurality of page servers to dynamically generate said Web page;*
*wherein said selection is based on determining a least busy one from each of said plurality of page servers, said selected page server being determined as said least busy one of said plurality of page servers.*

47. The machine readable medium of Claim 20, further comprising:
receiving said generated Web page at said Web server;
providing said generated Web page from said Web server to a source of said request.

48. A machine readable medium having stored thereon data representing sequences of instructions, which when executed by a computer system, cause said computer system to perform the steps of:
- routing a dynamic Web page generation request from a Web server to a selected page server, said selected page server receiving said request and releasing said Web server to process other requests wherein said routing step further includes the steps of intercepting said request at said Web server, routing said request from said Web server to a dispatcher, and dispatching, by said dispatcher, said request to said selected page server;
- processing said request, said processing being performed by said selected page server while said Web server concurrently processes said other requests; and
- dynamically generating a Web page by said selected page server, said Web page including data retrieved from one or more data sources; and
- wherein dispatching includes:
  - examining said request to make a selection of which page server should process said request from among a plurality of page servers that can each generate the Web page requested by said request;
  - selecting one of said plurality of page servers to dynamically generate said Web page;
- wherein said selection is based on examining dynamic information regarding a relative busyness of each of said plurality of page servers and selecting said selected page server based on said examination.

49. The machine readable medium of Claim 20, further comprising:
storing the dynamically generated Web page for later retrieval by the Web server.

(12) EX PARTE REEXAMINATION CERTIFICATE (9147th)
United States Patent
Lowery et al.

(10) Number: US 5,894,554 C1
(45) Certificate Issued: Jul. 24, 2012

(54) SYSTEM FOR MANAGING DYNAMIC WEB PAGE GENERATION REQUESTS BY INTERCEPTING REQUEST AT WEB SERVER AND ROUTING TO PAGE SERVER THEREBY RELEASING WEB SERVER TO PROCESS OTHER REQUESTS

(75) Inventors: Keith Lowery, Richardson, TX (US);
Andrew B. Levine, Plano, TX (US);
Ronald L. Howell, Rowlett, TX (US)

(73) Assignee: Epicrealm Licensing LLC, Dallas, TX (US)

Reexamination Request:
No. 90/008,342, Nov. 27, 2006
No. 90/008,562, Mar. 29, 2007
No. 90/008,574, Apr. 3, 2007

Reexamination Certificate for:
Patent No.: 5,894,554
Issued: Apr. 13, 1999
Appl. No.: 08/636,477
Filed: Apr. 23, 1996

(51) Int. Cl.
*G06F 15/16* (2006.01)
*G06F 17/30* (2006.01)

(52) U.S. Cl. .............. 709/203; 709/238; 709/245; 709/310; 707/999.01; 707/999.104; 707/E17.117

(58) Field of Classification Search .................. None
See application file for complete search history.

(56) References Cited

To view the complete listing of prior art documents cited during the proceeding for Reexamination Control Number 90/008,342, 90/008,562, and 90/008,574, please refer to the USPTO's public Patent Application Information Retrieval (PAIR) system under the Display References tab.

*Primary Examiner* — Mary Steelman

(57) ABSTRACT

The present invention teaches a method and apparatus for creating and managing custom Web sites. Specifically, one embodiment of the present invention claims a computer-implemented method for managing a dynamic Web page generation request to a Web server, the computer-implemented method comprising the steps of routing the request from the Web server to a page server, the page server receiving the request and releasing the Web server to process other requests, processing the request, the processing being performed by the page server concurrently with the Web server, as the Web server processes the other requests, and dynamically generating a Web page in response to the request, the Web page including data dynamically retrieved from one or more data sources.

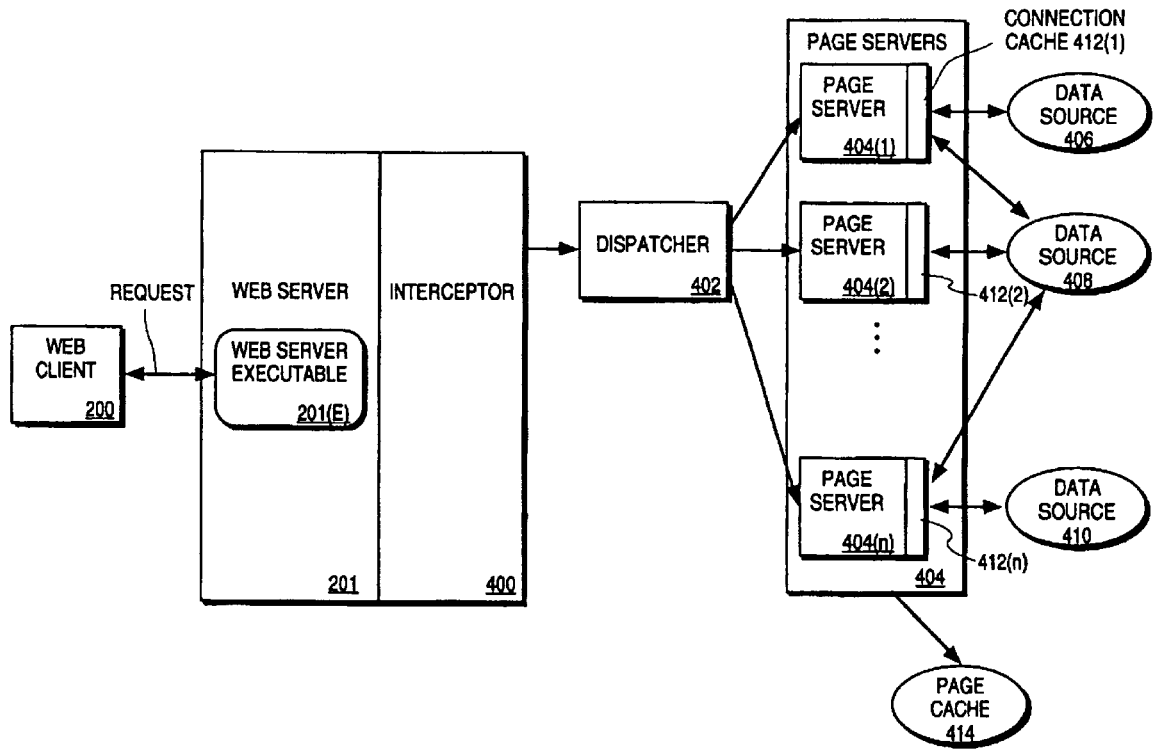

US 5,894,554 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-11 are cancelled.

New claims 12-49 are added and determined to be patentable.

12. *The computer-implemented method of claim 1, wherein intercepting said request consists of determining that a page server should process the request.*

13. *The computer-implemented method of claim 1, wherein intercepting said request includes determining that a page server should process the request.*

14. *The computer-implemented method of claim 13, wherein said determining step includes determining that Web requests should be processed by a page server.*

15. *The computer-implemented method of claim 14, wherein said determining step includes determining that other requests should be processed by said Web server.*

16. *The computer-implemented method of claim 1, wherein releasing said Web server consists of freeing at least some resources of said Web server.*

17. *The computer-implemented method of claim 1, wherein said Web server is released to process other requests upon routing of said request.*

18. *The computer-implemented method of claim 17, wherein said Web server is released to process other requests upon intercepting of said request.*

19. *The computer-implemented method of claim 1, wherein the page server comprises application software and operating system software.*

20. *The computer-implemented method of claim 1, wherein routing said request is based at least in part on a uniform resource locator associated with the request.*

21. *The computer-implemented method of claim 1, further comprising:*
    *retaining dynamic information regarding data sources that any page server can access to generate the Web page pursuant to the request.*

22. *The computer-implemented method of claim 1 wherein information used to select said page server includes whether a Web page pursuant to said request is cached at said page server.*

23. *The computer-implemented method of claim 1, further comprising:*
    *receiving dynamically updated information concerning said page server.*

24. *The computer-implemented method of claim 1, further comprising:*
    *examining a load on said page server;*
    *sending said request to said page server based on said load.*

25. *The computer-implemented method of claim 1, further comprising:*
    *sending said request according to said page server's available resources.*

26. *The computer-implemented method of claim 1, wherein said page server is least busy of a plurality of page servers.*

27. *The computer-implemented method of claim 1, further comprising:*
    *receiving said generated Web page at said Web server;*
    *providing said generated Web page from said Web server to a source of said request.*

28. *The computer-implemented method of claim 1, wherein said dispatcher examines information regarding which of the plurality of page servers are capable of servicing the request and selecting said page server based on the examination.*

29. *The computer-implemented method of claim 1, wherein said dispatcher examines information regarding the relative busyness of the plurality of page servers and selecting said page server based on the examination.*

30. *The computer-implemented method of claim 1, wherein said dispatcher examines information regarding which of the plurality of page servers are operational and selecting said page server based on the examination.*

31. *A computer-implemented method for managing a dynamic Web page generation request to a Web server, said computer-implemented method comprising the steps of:*
    *routing said request from said Web server to a page server, said page server receiving said request and releasing said Web server to process other requests, wherein said routing step further includes the steps of intercepting said request at said Web server, routing said request from said Web server to a dispatcher, and dispatching said request to said page server, wherein dispatching includes:*
        *examining said request to make an informed selection of which page server should process said request based on dynamic information maintained about page servers, the dynamic information indicating which page server can more efficiently process said request; and*
        *sending said request to the selected page server;*
    *processing said request, said processing being performed by said page server while said Web server concurrently processes said other requests; and*
    *dynamically generating a Web page in response to said request, said Web page including data dynamically retrieved from one or more data sources.*

32. *The computer-implemented method in claim 31 wherein said step of processing said request includes the step of identifying said one or more data sources from which to retrieve said data.*

33. *The computer-implemented method in claim 32 wherein said step of dynamically generating said Web page includes the step of dynamically retrieving said data from said one or more data sources.*

34. *The computer-implemented method in claim 33 wherein said step of processing said request includes the step of said page server maintaining a connection cache to said one or more data sources.*

35. *The computer-implemented method in claim 33 wherein said step of processing said request includes the step of logging into said one or more data sources.*

36. *The computer-implemented method in claim 33 wherein said step of dynamically generating said Web page includes the step of maintaining a page cache containing said web page.*

37. The computer-implemented method in claim 33 wherein said page server includes custom HTML extension templates for configuring said Web page.

38. The computer-implemented method in claim 37 wherein said step of processing said request further includes the step of inserting said dynamically retrieved data from said one or more data sources into said custom HTML extension templates.

39. A networked system for managing a dynamic Web page generation request, said system comprising:
  one or more data sources;
  a page server having a processing means;
  a first computer system including means for generating said request; and
  a second computer system including means for receiving said request from said first computer, said second computer system also including a router, said router routing said request from said second computer system to said page server, wherein said routing further includes intercepting said request at said second computer, routing said request from said second computer to a dispatcher, and dispatching said request to said page server, wherein dispatching includes:
    examining said request to make an informed selection of which page server should process said request based on dynamic information maintained about page servers, the dynamic information indicating which page server can more efficiently process said request; and
    sending said request to the selected page server;
said page server receiving said request and releasing said second computer system to process other requests, said page server processing means processing said request and dynamically generating a Web page in reponse to said request, said Web page including data dynamically retrieved from said one or more data sources.

40. The networked system in claim 39 wherein said router in said second computer system includes:
  an interceptor intercepting said request at said second computer system and routing said request; and
  a dispatcher receiving said routed request from said interceptor and dispatching said request to said page server.

41. A machine readable medium having stored thereon data representing sequences of instructions, which when executed by a computer system, cause said computer system to perform the steps of:
  routing a dynamic Web page generation request from a Web server to a page server, said page server receiving said request and releasing said Web server to process other requests wherein said routing step further includes the steps of intercepting said request at said Web server, routing said request from said Web server to a dispatcher, and dispatching said request to said page server, wherein dispatching includes:
    examining said request to make an informed selection of which page server should process said request based on dynamic information maintained about page servers, the dynamic information indicating which page server can more efficiently process said request; and
    sending said request to the selected page server;
  processing said request, said processing being performed by said page server while said Web server concurrently processes said other requests; and
  dynamically generating a Web page, said Web page including data retrieved from one or more data sources.

42. The computer-implemented method of claim 31, wherein intercepting said request consists of determining that a page server should process the request.

43. The computer-implemented method of claim 31, wherein intercepting said request includes determining that a page server should process the request.

44. The computer-implemented method of claim 43, wherein said determining step includes determining that Web requests should be processed by a page server.

45. The computer-implemented method of claim 44, wherein said determining step includes determining that other requests should be processed by said Web server.

46. The computer-implemented method of claim 31, wherein releasing said Web server consists of freeing at least some resources of said Web server.

47. The computer-implemented method of claim 31, wherein said Web server is released to process other requests upon routing of said request.

48. The computer-implemented method of claim 47, wherein said Web server is released to process other requests upon intercepting of said request.

49. The computer-implemented method of claim 31, wherein the page server comprises application software and operating system software.

* * * * *